(12) United States Patent
Wang et al.

(10) Patent No.: US 8,466,386 B2
(45) Date of Patent: Jun. 18, 2013

(54) METHOD FOR REPAIRING BONDED METALLIC STRUCTURES

(75) Inventors: Pei-Chung Wang, Troy, MI (US); John D. Fickes, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1196 days.

(21) Appl. No.: 11/539,969

(22) Filed: Oct. 10, 2006

(65) Prior Publication Data

US 2008/0085568 A1    Apr. 10, 2008

(51) Int. Cl.
*B23K 11/00*    (2006.01)

(52) U.S. Cl.
USPC ............... 219/117.1; 219/78.01; 219/86.1; 219/93; 438/4

(58) Field of Classification Search
USPC ............ 219/78.01, 117.1; 29/402.01, 402.09, 29/402.18, 402.19
See application file for complete search history.

(56) References Cited

U.S. PATENT DOCUMENTS

| | | | | |
|---|---|---|---|---|
| 2,569,059 A | * | 9/1951 | Huff et al. | 310/249 |
| 3,655,424 A | * | 4/1972 | Orowan | 428/164 |
| 4,832,252 A | * | 5/1989 | Fraser | 228/119 |
| 5,070,775 A | * | 12/1991 | Blake | 99/349 |
| 5,495,649 A | * | 3/1996 | Long | 29/275 |
| 6,454,156 B1 | * | 9/2002 | Taras et al. | 228/165 |
| 6,866,181 B2 | * | 3/2005 | Aota et al. | 228/112.1 |
| 7,037,621 B2 | * | 5/2006 | Kikuchi et al. | 429/211 |
| 2005/0173492 A1 | | 8/2005 | Workman et al. | |

FOREIGN PATENT DOCUMENTS

| | | | |
|---|---|---|---|
| GB | 1429630 A | * | 3/1976 |
| GB | 2414213 A | * | 11/2005 |
| JP | 58-110171 A | | 6/1983 |
| JP | 1182035 A | | 7/1989 |
| JP | 05-200557 A | | 8/1993 |
| JP | 07-323373 A | | 12/1995 |
| JP | 9029440 A | | 2/1997 |
| JP | 9285865 A | | 11/1997 |
| JP | 10272580 A | | 10/1998 |
| WO | WO 0237584 A1 | * | 5/2002 |

\* cited by examiner

*Primary Examiner* — Henry Yuen
*Assistant Examiner* — Thien S Tran
(74) *Attorney, Agent, or Firm* — Quinn Law Group, PLLC

(57) ABSTRACT

A method of repairing a bonded metallic structure having a first metallic member bonded to a second metallic member is provided. The method includes the steps of: A) forming a hole in at least one of the first metallic member and second metallic member, wherein said hole is sufficiently configured to receive a slug; B) inserting said slug into said hole; and C) passing electrical current through said slug of sufficient intensity to promote melting at the interface between the first metallic member, second metallic member, and said slug, thereby securing the first metallic member with respect to the second metallic member. Alternately, the method may include: D) positioning said slug near said hole; E) passing electrical current through said slug of sufficient intensity to promote arcing between said slug and the bonded metallic structure; and F) inserting said slug into said hole thereby securing the first metallic member with respect to the second metallic member.

10 Claims, 5 Drawing Sheets

US 8,466,386 B2

METHOD FOR REPAIRING BONDED METALLIC STRUCTURES

TECHNICAL FIELD

The present invention relates to a method for repairing bonded metallic structures.

BACKGROUND OF THE INVENTION

Modern automotive assembly techniques may include the use of so-called high-performance adhesives. These adhesives may be used to bond or adhere metallic members such as body panels and underbody support structures. The use of adhesives, while beneficial from a cost and mechanical performance standpoint, may pose problems when repairing damaged body panels. The facility performing the repair may not have the same type of adhesives available to the original equipment manufacturers and, as such, the bond between the body panel and support structure may be weaker than the original bond.

For example, many adhesives used by the original equipment manufacturer require a baking step wherein the adhesive is subject to an elevated temperature for a predetermined amount of time to promote the curing of the adhesive. Repair facilities may utilize adhesives that cure at ambient air temperatures; therefore, the bond strength may be significantly lower than that of the original equipment manufacturer. As such, various methods have been developed to provide satisfactory bond strength between metallic members when the original equipment manufacturer adhesive technology is unavailable.

SUMMARY OF THE INVENTION

A method of repairing a bonded metallic structure having a first metallic member bonded to a second metallic member is provided. The method includes the steps of: A) forming a hole, sufficiently configured to receive a slug, in at least one of the first metallic member and second metallic member; B) inserting the slug into the hole; and C) passing electrical current through the slug, the electrical current being of sufficient intensity to promote melting at the interface between the first metallic member, second metallic member, and the slug, thereby securing the first metallic member with respect to the second metallic member.

The method may further include coating the slug with a brazing material prior to inserting the slug into the hole such that the first metallic member and second metallic member are brazed to the slug as current is passed through the slug. The hole may be formed by methods known in the art such as drilling, punching, piercing, etc. Additionally, the hole may extend through the first metallic member and at least partially through the second metallic member. Further, the hole may be formed with a generally tapering shape and the slug having a complementary generally tapering shape. Alternately, the slug may be generally cylindrical in shape and may have a shoulder portion defined thereon.

In an alternate embodiment of the present invention, the method may include the steps of: A) forming a hole, sufficiently configured to receive a slug, in at least one of the first metallic member and second metallic member; B) positioning the slug near the hole; C) passing electrical current through the slug of sufficient intensity to promote arcing between the slug and the bonded metallic structure thereby melting at least a portion of the slug; and D) inserting at least the melted portion of the slug into the hole thereby securing the first metallic member with respect to the second metallic member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
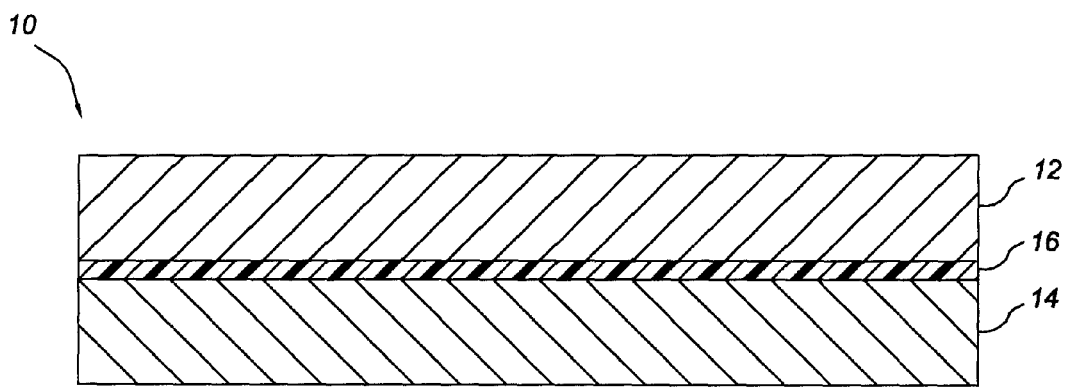
FIG. 1a is a schematic cross sectional view of a bonded metallic structure illustrating a first metallic member adhesively bonded to a second metallic member.

Referring to the drawings, wherein like reference numbers correspond to like or similar components throughout the several figures, there is shown schematically in FIG. 1a, a bonded metallic structure, generally indicated at 10. The bonded metallic structure 10 includes a first metallic member 12 bonded to a second metallic member 14 by an adhesive layer 16. The first metallic member 12 may be, for example, an automotive body panel, while the second metallic member 14 may be, for example, the flange of a support member. The first and second metallic members are preferably formed from steel.

Figure 1B:
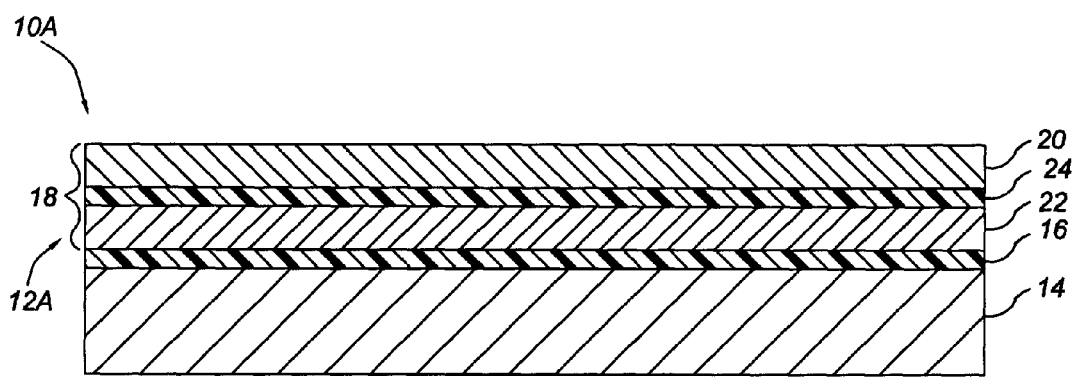
FIG. 1b is a schematic cross sectional view of an alternate embodiment of the bonded metallic structure of FIG. 1a illustrating a first metallic member formed from a constrained layer viscoelastic laminate.

Referring to FIG. 1b there is shown an alternate embodiment of the bonded metallic structure 10 of FIG. 1a, generally indicated at 10A. The bonded metallic structure 10A includes a first metallic member 12A bonded to the second metallic member 14 by the adhesive layer 16. The first metallic member 12A is formed from a constrained layer viscoelastic laminate 18. The constrained layer viscoelastic laminate 18 includes a first and second metal layer 20 and 22, respectively. A viscoelastic layer 24 is disposed between and is generally coextensive with the first and second metal layers 20 and 22. Those skilled in the art will recognize that the constrained layer viscoelastic laminate 18 may provide excellent sound and vibration damping qualities and is therefore used extensively in industry.

It is envisioned at some point during the service life of the bonded metallic structure 10 and 10A that the first metallic member 12, 12A may become damaged and need to be removed from the second metallic member 14. Should this occur, the replaced adhesive layer 16 may not be as strong as that originally used; therefore, additional measures may need to be taken in order to adequately secure the first metallic member 12, 12A to the second metallic member 14. Methods of accomplishing this repair are outlined in illustrative form in FIGS. 2a through 4b.

Figure 2A:
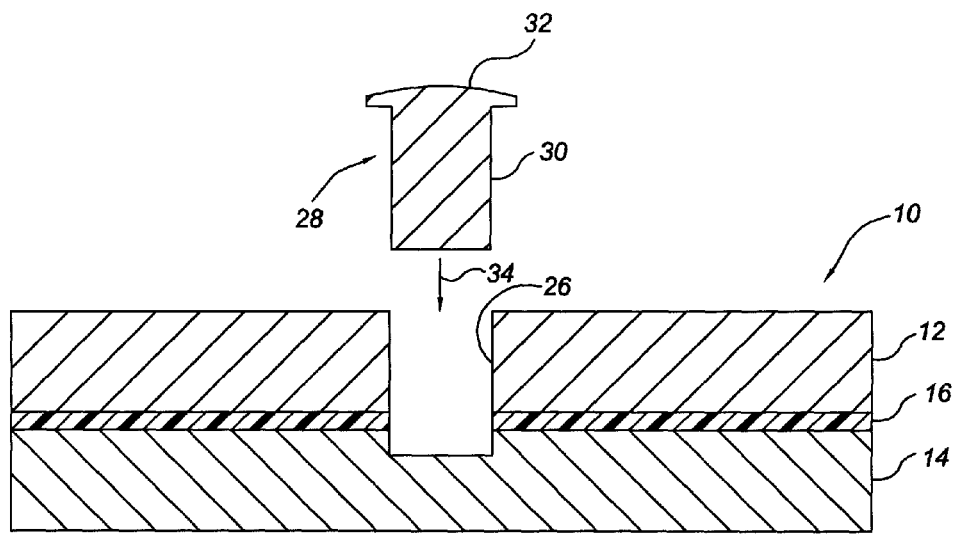
FIG. 2a is a schematic cross sectional view of the bonded metallic structure of FIG. 1a, illustrating in diagrammatic form the steps of forming a hole in the bonded metallic structure and inserting a slug therein.

Referring now to FIG. 2a, there is shown the bonded metallic structure 10 having a hole 26 defined therein. The hole 26 extends through the first metallic member 12 and at least partially into the second metallic member 14. The hole 26 may be formed by drilling, punching, piercing, or other hole forming methods known to those skilled in the art. The hole 26 is sufficiently configured to receive a slug 28. A slug 28 is preferably formed from metal and has a shaft portion 30 and a head portion 32. As the shaft portion 30 of the slug 28 is inserted into the hole 26, as indicated by arrow 34, the head portion 32 will abut the first metallic member 12 thereby limiting the travel of the slug 28 within the bonded metallic structure 10.

Figure 2B:
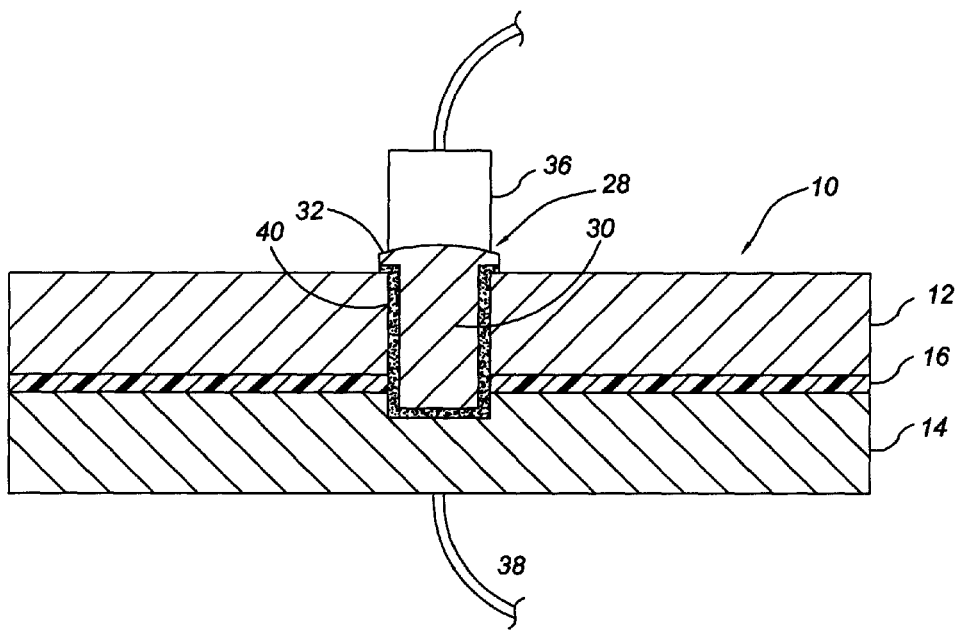
FIG. 2b is a schematic cross sectional view of the bonded metallic structure of FIG. 1a, illustrating in diagrammatic form the step of passing current through the slug of sufficient intensity to bond the slug to the bonded metallic structure.

Once the slug 28 is seated within the bonded metallic structure 10, an electrode 36 is pressed against the head portion 32, as shown in FIG. 2b. A ground 38 is provided to the second metallic member 14 such that current will flow through the slug 28. The current is supplied to the slug 28 at a level or intensity sufficient to cause heating and localized melting at the interfaces formed by the slug 28 and the first and second metallic members 12 and 14. This localized melting forms a weld, indicated at 40, thereby securing or welding the first and second metallic members 12 and 14 to the slug 28. Additionally, the head portion 32 is secured or welded to the first metallic member 12 providing an added measure of resistance to separation of the first and second metallic members 12 and 14. A coating of brazing material may be provided to the slug 28 to enable securing of the first and second metallic members 12 and 14 to the slug 28 through brazing. Those skilled in the art will recognize that the head portion 32 may be any shape including circular, square, rectangular, cross shaped, oval, etc. Additionally, the head portion 32 may be used for joint strengthening purposes. For example, if the head portion 32 is formed with a generally oval shape the major axis of the oval may be oriented substantially perpendicular to the loading direction of the bonded metallic structure 10.

Figure 3A:
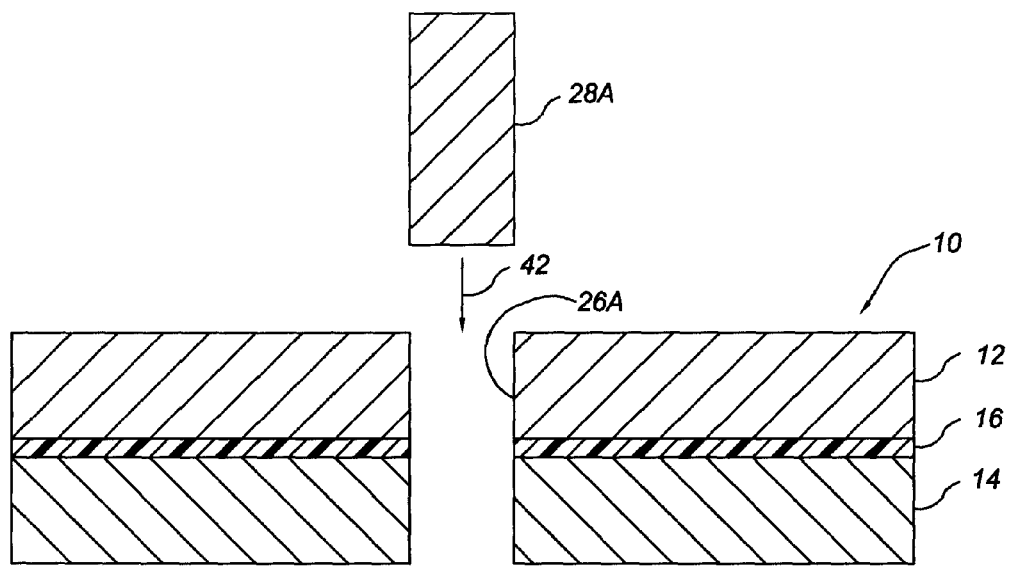
FIG. 3a is a schematic cross sectional view of the bonded metallic structure of FIG. 1a, illustrating in diagrammatic form the steps of forming a hole in the bonded metallic structure and inserting a slug therein.
Figure 3B:
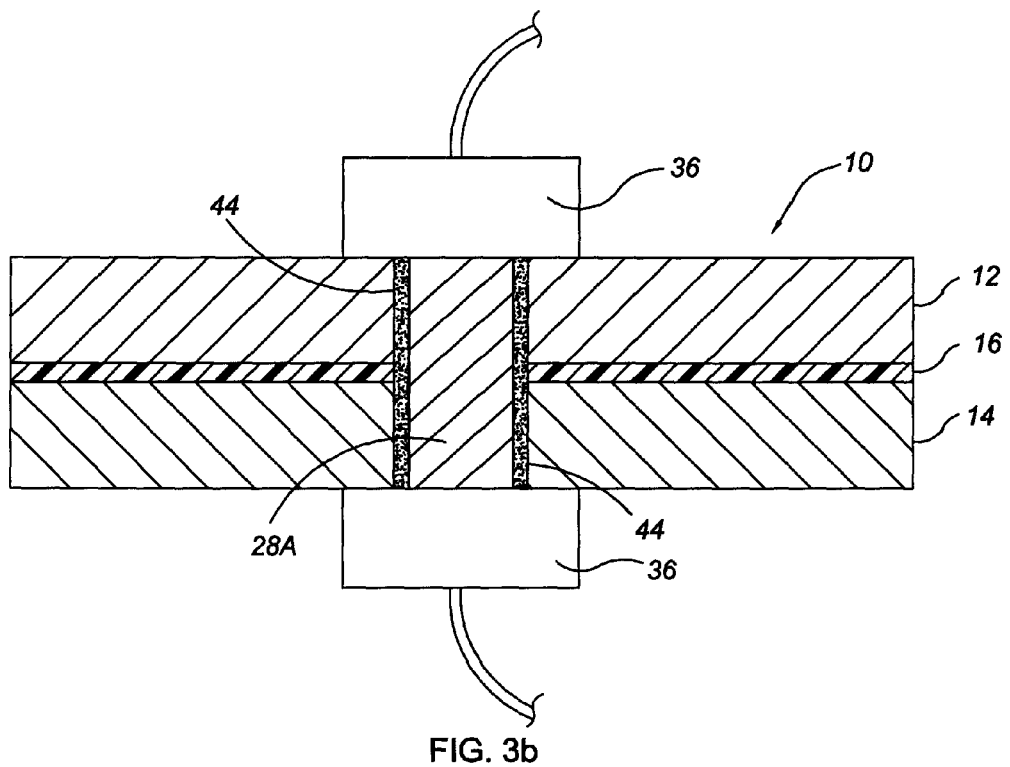
FIG. 3b is a schematic cross sectional view of the bonded metallic structure of FIG. 1a, illustrating in diagrammatic form the step of passing a current through the slug of FIG. 3a to bond the slug to the bonded metallic structure.

Referring now to FIGS. 3a and 3b there is shown an alternate method of securing the first and second metallic members 12 and 14 with respect to each other. FIG. 3a illustrates the bonded metallic structure 10 shown in FIG. 1a having a hole 26A extending substantially therethrough. The hole 26A is sufficiently configured to receive a slug 28A and as stated hereinabove may be formed by any method known to those skilled in the art. The slug 28A is preferably metal and is formed with substantially the same thickness as the bonded metallic structure 10 and is inserted into the hole 26A as indicated by arrow 42.

Once the slug 28A is seated within the bonded metallic structure 10, electrodes 36 are pressed against the slug 28A, as shown in FIG. 3b. Current is supplied to the slug 28A at a level or intensity sufficient to cause heating and localized melting at the interfaces formed by the slug 28A and the first and second metallic members 12 and 14. This localized melting forms a weld, indicated at 44, thereby securing or welding the first and second metallic members 12 and 14 to the slug 28A. A coating of brazing material may be provided to the slug 28A to enable securing of the first and second metallic members 12 and 14 through brazing.

Figure 4A:
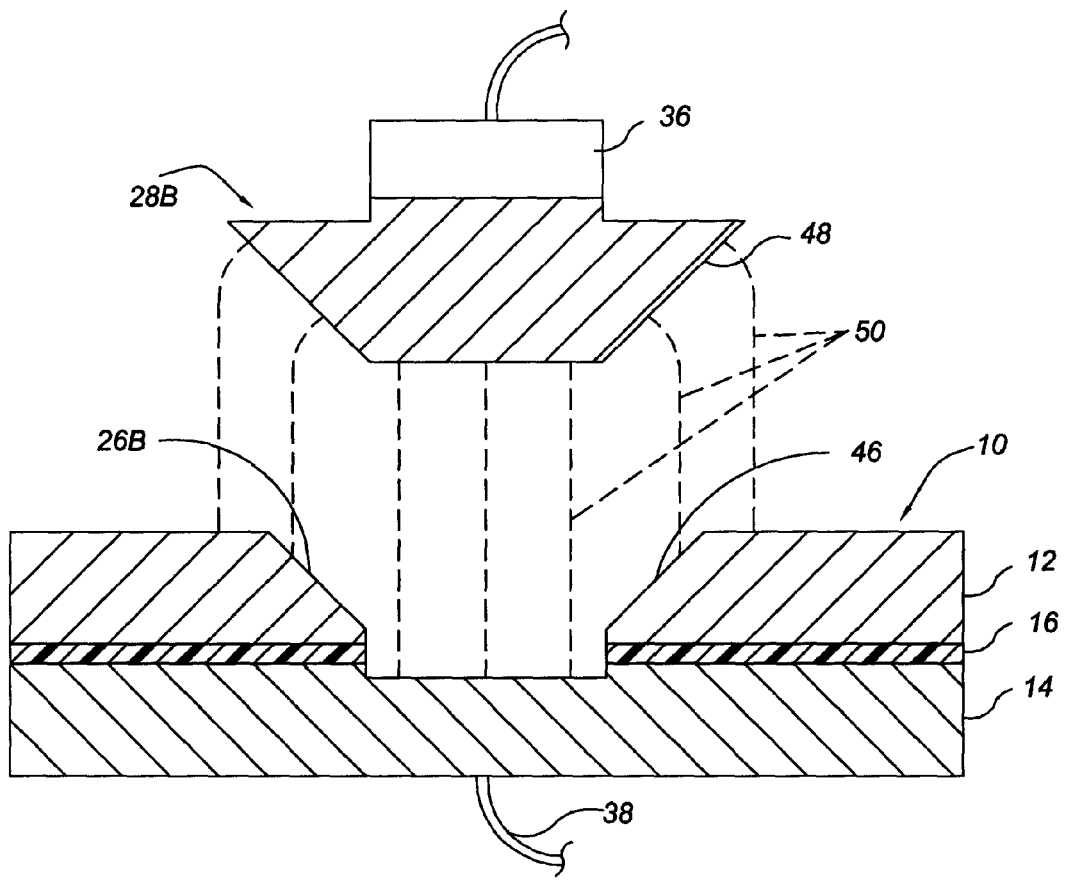
FIG. 4a is a schematic cross sectional view of the bonded metallic structure of FIG. 1a, illustrating in diagrammatic form the steps of forming a generally tapering hole and passing a current through a generally tapering slug to allow arcing to develop between the slug and the bonded metallic structure.
Figure 4B:
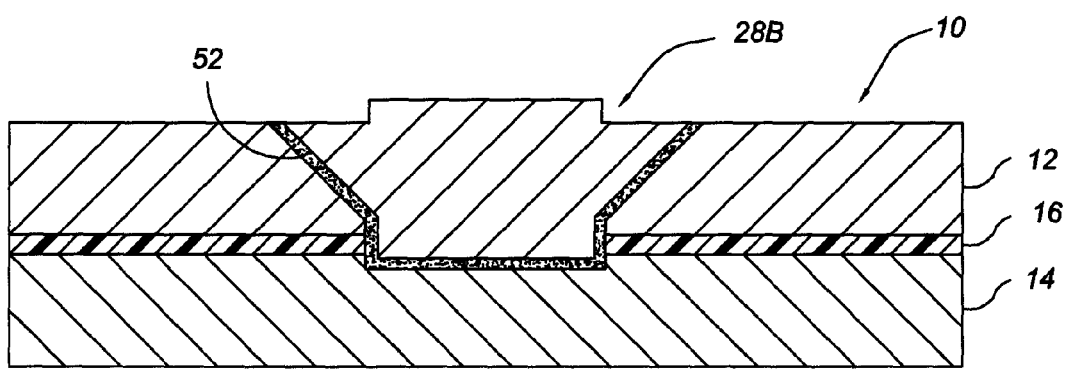
FIG. 4b is a schematic cross sectional view of the bonded metallic structure of FIG. 1a, illustrating in diagrammatic form the step inserting the slug of FIG. 4a into the hole to bond the slug to the bonded metallic structure.

Referring now to FIGS. 4a and 4b there is shown an alternate method of securing the first and second metallic members 12 and 14 with respect to each other. FIG. 4a illustrates the bonded metallic structure 10 shown in FIG. 1a having a hole 26B formed within the first metallic member 12 and partially extending into the second metallic member 14. The hole 26B has generally tapering sidewalls 46 sufficiently configured to receive a slug 28B having complementary generally tapering sidewalls 48. As stated hereinabove, the hole 26B may be formed by any means known to those skilled in the art.

As illustrated in FIG. 4a, the slug 28B is positioned or spaced in close proximity to the hole 26B. An electrical current is provided to the slug 28B via the electrode 36 of sufficient intensity to induce a desired amount of arcing, indicated by dashed lines 50, between the slug 28B and the bonded metallic structure 10. The arcing generates heat in both the slug 28B and the bonded metallic structure such 10 that localized melting occurs. The slug 28B is then moved into touching contact with the bonded metallic 10 such that a weld 52, shown in FIG. 4b, is formed thereby securing or welding the first and second metallic members 12 and 14 to the slug 28B. A coating of brazing material may be provided to the slug 28B to enable securing of the slug 28B to the first and second metallic members 12 and 14 through brazing. Although the hole 26B is shown in FIG. 4a with generally tapering sidewalls 46, those skilled in the art will recognize that other geometries for the hole 26B and slug 28B may be envisioned in order to provide the desired arcing characteristics.

While the discussion of the joining methods presented hereinabove illustrate the repair of the bonded metallic structure 10 shown in FIG. 1a, it should be noted that the claimed methods are equally effective to repair the bonded metallic structure 10A of FIG. 1b. That is, the claimed methods may be used effectively when one or both of the first and second metallic members 12 and 14 are formed from a constrained layer viscoelastic laminate 18 such as the first metallic member 12A of FIG. 1b. The claimed methods are an effective means to secure the first metallic members 12, 12A with respect to the second metallic member 14 since the heat transferred to the bonded metallic structure 10 is localized and of short duration; therefore, the potential for damaging the adhesive layer 16 due to high thermal excursions is substantially reduced.

The slugs 28, 28A, and 28B may be formed from high strength (i.e. high carbon equivalence) or low carbon steel. When the slugs 28, 28A, and 28B are formed from high strength steel, and subsequently welded to the first metallic members 12 or 12A and the second metallic member 14, formed from low carbon steel, the strength of the resulting weldment will increase. Alternately, when the slugs 28, 28A, and 28B are formed from low carbon steel, the strength of the resulting weldment will decrease due to carbon dilution. This may be beneficial to provide a "pull out" failure mode for the slugs 28, 28A, and 28B from the bonded metallic structure 10.

Figure 5A:
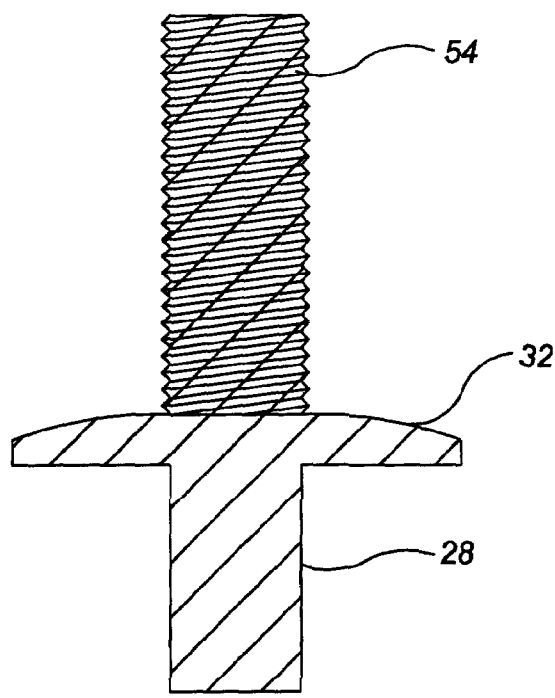
FIG. 5a is a schematic partial cross sectional view of the slug of FIG. 2a having a stud disposed thereon.
Figure 5B:
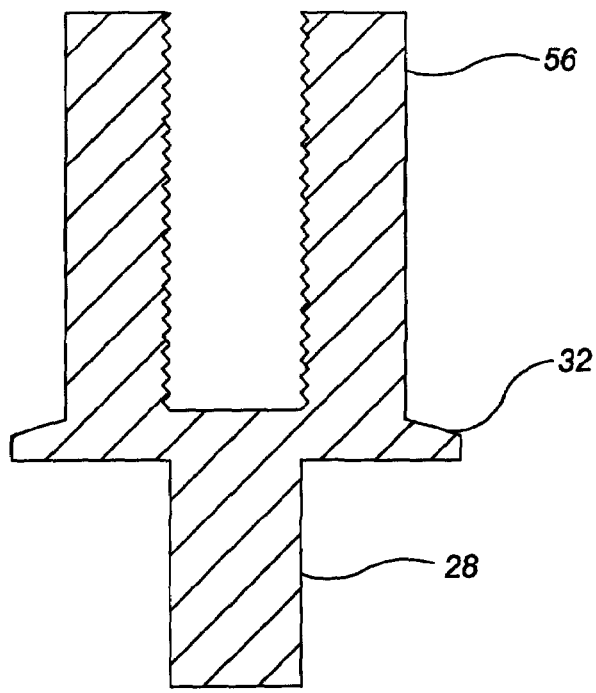
FIG. 5b is a schematic cross sectional view of the slug of FIG. 2a having a nut disposed thereon.

FIG. 5a illustrates the slug 28 having a stud 54 provided thereon. The stud 54 may be formed integrally with the slug 28, or may be mounted thereto. FIG. 5b illustrates the slug 28 having a nut 56 provided thereon. The nut 56 may be formed integrally with the slug 28, or may be mounted thereto. Those skilled in the art will recognize that the stud 54 and nut 56 may be employed as a mount or attachment point on the bonded metallic structure 10. Additionally, those skilled in the art will recognize that the stud 54 and nut 56 may be provided on the studs 28A and 28B, while remaining within the scope of that which is claimed.

While the best modes for carrying out the invention have been described in detail, those familiar with the art to which this invention relates will recognize various alternative designs and embodiments for practicing the invention within the scope of the appended claims.

The invention claimed is:

1. A method of repairing a metallic structure having a first metallic member, a second metallic member and an adhesive layer between the first and second metallic members, wherein the first metallic member and the second metallic member are bonded to the adhesive layer, the method comprising:
    forming a hole in at least one of the first metallic member and second metallic member, wherein said hole is sufficiently configured to receive a slug;
    wherein said hole extends through the adhesive layer bonding the first metallic member to the second metallic member;
    inserting said slug into said hole and through the adhesive layer to define a first interface between a first portion of the slug and the first metallic member, a second interface between a second portion of the slug and the second metallic member, and a third interface between a third portion of the slug and the adhesive layer;
    passing electrical current through said slug, wherein said electrical current is of sufficient intensity to form a first weld at the first interface between the first metallic member and said slug and to form a second weld at the second interface between the second metallic member and said slug, thereby securing the first metallic member with respect to the second metallic member; and
    wherein the first weld and the second weld are separated by the third interface after forming the first and second welds.

2. The method of claim 1, further comprising coating said slug with a brazing material prior to inserting said slug into said hole such that the first metallic member and second metallic member are brazed to said slug as said current is passed through said slug.

3. The method of claim 1, wherein said hole is formed in at least one of the first metallic member and second metallic member by one of punching, piercing, and drilling.

4. The method of claim 1, wherein said slug has one of a stud and a nut provided thereon.

5. The method of claim 1, wherein said hole extends through the first metallic member and at least partially through the second metallic member.

6. The method of claim 1, wherein said hole is formed with a generally tapering shape and wherein said slug has a complementary generally tapering shape.

7. The method of claim 1, wherein said slug is generally cylindrical in shape.

8. The method of claim 1, further comprising providing a shoulder portion on said slug to limit the travel of said slug within said hole during insertion.

9. The method of claim 1, wherein at least one of the first and second metallic members is one of a body panel and a support structure on a vehicle.

10. The method of claim 1, wherein the adhesive layer is characterized by a uniform thickness.

* * * * *